(12) United States Patent
Schultz et al.

(10) Patent No.: US 8,110,152 B2
(45) Date of Patent: *Feb. 7, 2012

(54) GAS SENSOR MOUNTING BOSS AND METHOD OF MAKING

(75) Inventors: Eric C. Schultz, Flushing, MI (US); Stephen J. Myers, Owosso, MI (US); Jeffrey B. Hardesty, Big Rapids, MI (US); Dana M. Serrels, Davidson, MI (US)

(73) Assignee: Katcon Global S.A., Luxembourg (LU)

( * ) Notice: Subject to any disclaimer, the term of this patent is extended or adjusted under 35 U.S.C. 154(b) by 1090 days.

This patent is subject to a terminal disclaimer.

(21) Appl. No.: 11/669,749

(22) Filed: Jan. 31, 2007

(65) Prior Publication Data

US 2007/0160510 A1   Jul. 12, 2007

Related U.S. Application Data

(63) Continuation-in-part of application No. 09/903,983, filed on Jul. 12, 2001, now Pat. No. 7,279,140.

(60) Provisional application No. 60/764,305, filed on Feb. 1, 2006.

(51) Int. Cl.
*B01D 50/00* (2006.01)

(52) U.S. Cl. ....... 422/177; 60/276; 123/703; 29/890.08; 29/890.13; 29/890.15

(58) Field of Classification Search .............. 422/83, 422/84, 98, 103, 104, 176, 177; 123/672, 123/703; 60/276; 29/890.08, 890.13, 890.15

See application file for complete search history.

(56) References Cited

U.S. PATENT DOCUMENTS

| 4,454,741 | A | 6/1984 | Hoogenboom |
| 4,883,643 | A | 11/1989 | Nishio et al. |
| 5,615,551 | A | 4/1997 | Matsushima |
| 6,338,827 | B1 | 1/2002 | Nelson |
| 6,354,903 | B1 | 3/2002 | Nelson |
| 6,361,821 | B1 | 3/2002 | Anderson et al. |
| 6,391,822 | B1 | 5/2002 | Dou et al. |
| 6,455,463 | B1 | 9/2002 | Labarger et al. |
| 6,464,945 | B1 | 10/2002 | Hemingway |
| 6,532,659 | B1 | 3/2003 | DeSousa et al. |
| 6,555,070 | B1 | 4/2003 | Kruger |
| 6,624,113 | B2 | 9/2003 | Labage et al. |
| 6,643,928 | B2 | 11/2003 | Hardesty et al. |
| 7,279,140 | B2 * | 10/2007 | Myers et al. .................. 422/177 |
| 2001/0025419 | A1 | 10/2001 | Celerier et al. |

FOREIGN PATENT DOCUMENTS

| DE | 19811569 | 9/1999 |
| EP | 992659 | 4/2000 |
| WO | WO-9845584 | 10/1998 |

OTHER PUBLICATIONS

Various printouts from Robertspeck.com dated Jan. 20, 2006.

* cited by examiner

*Primary Examiner* — Jill Warden
*Assistant Examiner* — Dwayne K Handy
(74) *Attorney, Agent, or Firm* — Butzel Long (57) ABSTRACT

An outer housing and method of forming a mounting boss therein, the outer housing comprising: an elongated housing portion defining an inlet opening and an outlet opening, the elongated housing portion having a thickened area defined by an overlapping portion of the elongated housing; a sensor mounting boss formed in the overlapping portion with only displaced portions of the overlapping portion; and a plurality of threads disposed in the sensor mounting boss.

22 Claims, 6 Drawing Sheets

GAS SENSOR MOUNTING BOSS AND METHOD OF MAKING

CROSS REFERENCE TO RELATED APPLICATIONS

This application claims the benefit of U.S. Provisional Patent Application Ser. No. 60/764,305, filed Feb. 1, 2006, the contents of which are incorporated herein by reference thereto.

This application is a continuation-in-part of U.S. patent application Ser. No. 09/903,983, filed Jul. 12, 2001, the contents of which are incorporated herein by reference thereto.

BACKGROUND

The present invention relates to a mounting boss for a gas sensor in an exhaust system. More particularly, the present invention relates to a mounting boss and method of making.

Oxygen gas sensors or exhaust constituent sensors have been used in vehicles to sense the presence of constituents (e.g., oxygen, hydrocarbons, nitrous oxides, etc.) in an exhaust gas flow and to sense and/or signal, for example, when an internal combustion engine switches from rich to lean or lean to rich operation.

Because exhaust gas sensors are required to be positioned within an exhaust gas flow, the exhaust gas sensor is usually mounted to a portion of the exhaust system. Furthermore and due to application requirements, the exhaust system itself will have unique exterior configurations, which may not be optimal mounting locations for exhaust sensors (e.g., irregular welding surfaces, angular surfaces, etc.). In addition, and due to the gas sensor mounting location, the sensor is exposed to and must be able to withstand vibration and jarring which occur during vehicle operation as it traverses along rough roads. Accordingly, exhaust system designs and oxygen and/or other gas sensor design limitations limit the positioning and configuration of the gas sensor within an exhaust system. For example and in one application, a prefabricated mounting boss is secured to the exhaust system by an attachment method wherein the boss is inserted into or about a hole pierced in an end cone of the exhaust system and the boss is welded to the end cone using metal inert gas (MIG) welding or projection welding. However, this process requires the application of a separate boss to be welded to a welding surface, which must be flat and the boss is welded about the hole. In addition, the welding of the boss itself to the end cone is not without problems as weld spatter may be found in the threads and there may be anyone of the following; thread distortion, weld skips, or voids, which are created by the welding processes or heat. In addition, and in order to weld such bosses to the exhaust system housing the same must have a sidewall thickness sufficient to have the boss welded thereto.

Accordingly, it is desirable to provide a robust gas sensor mounting boss and method of making wherein the sensor is rigidly secured to a sidewall of the housing.

SUMMARY OF THE INVENTION

An outer housing for an exhaust system, the outer housing comprising: an elongated housing portion defining an inlet opening and an outlet opening, the elongated housing portion having a thickened area defined by an overlapping portion of the elongated housing; a sensor mounting boss formed in the overlapping portion with only displaced portions of the overlapping portion; and a plurality of threads disposed in the sensor mounting boss.

A method of forming a mounting boss for a gas sensor in an outer housing of an exhaust gas component, the method comprising: overlapping a first shell portion of the exhaust gas component with a second shell portion of the exhaust gas component; securing the first shell portion of the shell to the second shell portion to define an overlapping portion; forming a mounting boss in the overlapping portion with flowdrilling process, the mounting boss being formed from displaced material of the overlapping portion.

A catalytic converter, comprising: a shell portion defining an inlet opening and an outlet opening, the shell portion having an overlapping portion defined by a first end portion being secured to a second end portion of the shell portion to define the overlapping portion; and a sensor mounting boss formed in the overlapping portion by displacing a portion of the overlapping portion to provide the sensor mounting boss in the overlapping portion; and a plurality of threads disposed in the sensor mounting boss.

DETAILED DESCRIPTION OF EXEMPLARY EMBODIMENTS

In accordance with exemplary embodiments of the present invention an exhaust system component with an integral sensor busing is provided. In one non-limiting exemplary embodiment, the exhaust system component comprises a catalytic converter unit and a bushing element is provided in a shell wall of the catalytic converter unit wherein an oxygen sensor or other type of sensor is secured to the bushing and a sensing element of the sensor is positioned within the exhaust flow of the catalytic converter unit. In accordance with an exemplary embodiment of the present invention a portion of the sensor extends through the bushing element and a connector portion of the sensor is disposed in intimate contact with a portion of the bushing element.

In one exemplary embodiment, a bushing element is provided in a housing wall of an endcone or other housing portion of a catalytic converter, and an oxygen sensor having a connector is disposed in intimate contact with said bushing element to thereby mount the sensor in the exhaust flow. By mounting the oxygen sensor through the catalytic converter endcone, the sensor no longer extends radially out from the centerline of the exhaust flow, but rather is positioned at an angle to the centerline of the exhaust component (e.g., at an angle less than 90 degrees) and, accordingly, facilitates packaging the system underneath a vehicle.

In accordance with an exemplary embodiment of the present invention, the component of the exhaust system (e.g., end cone or outer housing portion) integrates a sensor (oxygen or otherwise) into an exhaust treatment device. The catalytic converter and endcone may be either internally insulated or non-internally insulated. The mat insulating material typically located between the inner and outer housing layers of the converter endcone should be protected from the exhaust gases in order to maintain control of the outer skin temperature as well as prevent erosion of the insulation material sandwiched between the outer and inner cone surfaces. Therefore and in an exemplary embodiment of the present invention, it is preferred in mounting the oxygen sensor in the endcone to fabricate a bushing accomplishing a seal between the inner and outer endcones. Accordingly, flats (FIG. 20) may be formed in the inner and outer endcone surfaces to facilitate good fit-up either for flow drilling or welding bushing applications.

The oxygen sensor bushing through which the sensor is mounted is formed into the shell of the converter, by form drilling, as described in detail herein, or welded into the endcone using techniques such as arc welding, friction/inertia welding, rotated drawn arc welding, flash/forge welding, metal inert gas (MIG) welding, or other such suitable welding methods.

In accordance with an exemplary embodiment of the present invention the method for forming the integral bushing for securing an oxygen sensor to an exhaust system component comprises contacting the outer sheet metal wall of an exhaust system component with a blunt rotated bit; the friction between the surfaces softening the material of the wall where said rotated bit contacts the exhaust system component, allows the bit to be pushed through the outer and then inner walls; penetrating the softened material with said rotated bit to form an extruded skirt that can be roll formed and threaded to create a bushing; and, using a connector, mounting an oxygen sensor within the bushing. In a double-walled construction, such as a typical endcone arrangement, the extruded skirt material formed when penetrating the outer wall merges with the upset material formed when penetrating the inner wall, so as to result in a continuous connection between the two walls, that can be tapped to accept a threaded connector of an oxygen sensor.

Another suitable technique includes friction/inertia welding wherein a bushing (in this case tapered to contact the two layers of pre-drilled endcone wall material) is rotated at high speed and held against the sheet metal cone material. The heat generated by the friction softens the bushing and two layers of endcone wall material, which then are pressed together creating a sealing/structural bond.

In a rotated drawn arc welding method of attachment, a current is passed through a bushing component and a pre-drilled wall of a converter endcone. The parts then are moved apart (drawn) until an arc has the required energy to perform the welding process. A rotating magnetic field is then used to cause the arc to move around the circumference of the bushing (heating the circular future contact area). When the bushing and endcone parts are heated sufficiently, they then are forced together to form a bond.

An exemplary embodiment of the present invention relates to an exhaust system component comprising a gas sensor mounting boss integrally formed in a shell portion or end cone of a catalytic converter of the exhaust system, wherein the gas sensor mounting boss is formed in an overlapping portion of the shell portion. In accordance with an exemplary embodiment, the gas sensor can be any conventional sensor such as oxygen sensors currently used in vehicle exhaust systems.

Exemplary embodiments of the present invention are also directed to a shell portion having a threaded gas sensor mounting boss formed therein, wherein the gas sensor mounting boss is provided with a more robust mounting location. In addition, exemplary embodiments of the present invention allow the gas sensor to be mounted to a portion of the catalytic converter where less turbulent gas flows are observed (e.g., within an elongated housing portion as opposed to end cones located at either end of the elongated housing portion).

Figure 1:
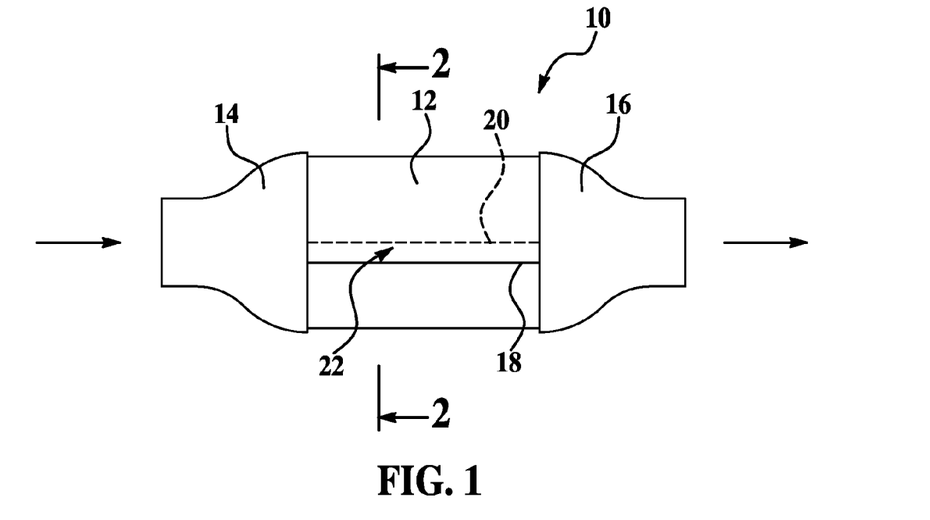
FIG. 1 is a schematic illustration of an outer housing for an exhaust system.

Referring now to FIG. 1, a non-limiting example of an outer housing 10 of a catalytic converter is illustrated. Here outer housing 10 comprises an elongated housing portion or shell 12 defining an inlet end and an outlet end wherein a first end cone portion 14 is secured to the inlet end and a second end cone portion 16 is secured to the outlet end. In addition, a catalyst (not shown) is housed within shell 12. It being understood that the size, shape and configurations of the first end cone portion, the second end cone portion and the elongated housing portion or shell may vary. In accordance with an exemplary embodiment a non-limiting example of the sheet metal used for housing portion 12 is stainless steel. Of course, other suitable materials are contemplated for use in exemplary embodiments of the present invention.

In accordance with an exemplary embodiment, wall portions or end portions 18 and 20 of the material defining the elongated housing portion or shell are joined together so that one end portion or end portion of the shell overlaps another wall portion or end portion of the shell. Together end portions 18 and 20 define an overlapping portion 22. The thickness of the overlapping portion will be greater than a thickness of a single wall portion of the shell. In accordance with an exemplary embodiment, the two wall portions overlap each other a distance greater than a typical overlapping weld seal (e.g., those typically used for a weld seal). As will be discussed herein and in accordance with an exemplary embodiment the larger overlapping distance provides an enlarged area for securement sensor thereto. In other words the overlapping portion provides a thicker area for use in a flow drilling process.

Figure 2:
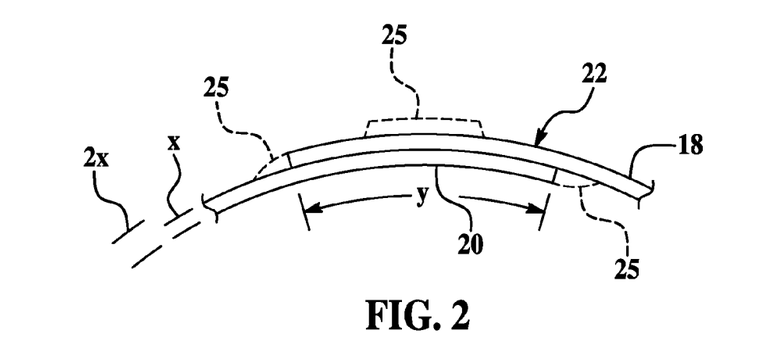
FIG. 2 is a view along lines 2-2 of FIG. 1.

As shown in FIG. 2, the end portions overlap each other a distance "y", which is sufficient for the mounting boss to be formed therein. In accordance with one non-limiting exemplary embodiment distance "y" is at least or approximately 1.2 inches or approximately 30.5 millimeters, which is much greater than a distance typically required for welding the end portions of the shell member together. Other non-limiting distances for "y" are within the range of 1 to 2 inches or 1 to 3 inches. Of course, the overlap distance may be greater of less than the aforementioned ranges as long as enough material is present for the flow drilling process (e.g., two layers of the housing wide enough to provide the diameter of the bushing formed by the flow drilling process). In addition, and referring to FIG. 2 a non-limiting thickness of the sheet metal of the housing portion is defined by a distance "x", which is approximately 1.2 millimeters. Accordingly, the overlapping portion is defined by a thickness of "2x" or 2.4 mm by "y", which is sufficient for an area to provide a mounting boss therein. Of course, wall thicknesses greater or less than the aforementioned values are contemplated to be within the scope of exemplary embodiments of the present invention.

Figure 3:
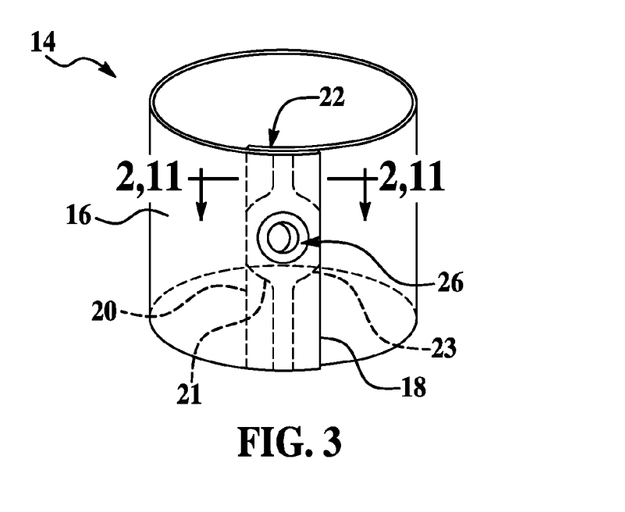
FIG. 3 is a perspective view of an outer housing with a mounting boss formed therein in accordance with an exemplary embodiment of the present invention.

Referring now to FIG. 3, a perspective view of the elongated housing or shell portion without end cones 14 and 16 secured thereto is provided. In one exemplary embodiment, the overlapping portion traverses the entire length of the outer housing. In an alternative exemplary embodiment and as illustrated by the dashed lines in FIG. 3, the first and second end portions each have an enlarged tab portion 21 and 23, which overlap each other to define the overlapping portion. In addition to typical securement methods for securing the end portions of the shell member together and in an alternative exemplary embodiment and in addition to the securing of the two end portions together (e.g., arc welds, friction/inertia welds, rotated drawn arc welding, flash/forge welding, tack welds, metal inert gas (MIG) welds, TIG welds, laser welds or equivalents thereof) additional welds 25 are provided at either side of the overlapping area proximate to the area into which the gas sensor mounting boss is to be formed. These welds may be employed, should a more rigid securement between the end portions of the shell member be required at the point where the flowdrilling process is to take place. Alternatively and/or in addition to welds 25, a circular weld 25 (illustrated by the dashed lines in FIG. 2) is provided in the overlapping area to provide an additional means of securement between the end portions comprising the overlapping portion.

FIG. 3 also shows a gas sensor mounting boss 26 formed in the overlapping portion of the housing or shell portion in accordance with an exemplary embodiment of the present invention. In accordance with an exemplary embodiment, gas sensor mounting boss 26 is formed in the overlapping portion by a form drill process, for example a flow drill operation, wherein a thermal drilling process (e.g., flowdrilling) is used to form a hole and simultaneously produce a bushing from the metal adjacent to which the hole is being formed in. The bush or bushing gives additional support as a bearing surface or for a thread of the hole being formed. Additional information illustrating this process is found at the following web address: http://www.robertspeck.com/formdp.htm as well as print outs from the aforementioned web page provided in the information disclosure citation attached hereto and identified as various printout from robertspeck.com dated Jan. 20, 2006, the contents of which are incorporated herein by reference thereto.

Figure 4:
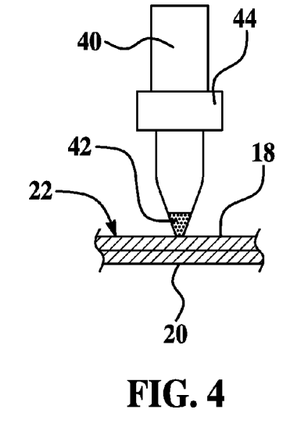
FIGS. 4-10 show sequential views of a process for forming a boss in an overlapping portion of the outer housing of the exhaust system.

Referring now to FIGS. 4-9, portions of overlapping portion 22 are shown having gas sensor mounting boss 26 formed therein using the aforementioned flow drilling process in accordance with an exemplary embodiment of the present invention. As illustrated, sequentially in the FIGS. 4-9, a portion of the overlapping portion deforms when a rotated bit 40 makes contact with and passes through the overlapped portion to form the mounting boss. As shown in FIG. 4, bit 40 is applied to an outer surface of the overlapping portion with substantially constant pressure such that, at first, just a tip 42 of bit 40 makes contact with the outer surface.

Figure 5:
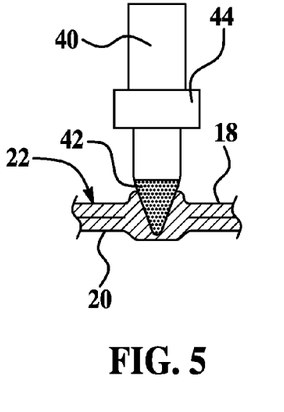
Figure 6:
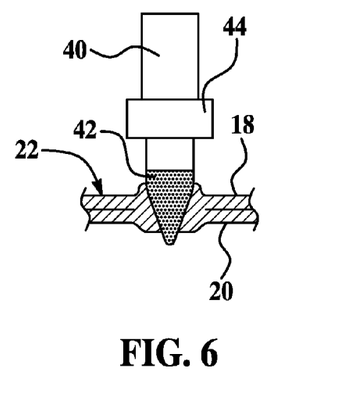
Figure 7:
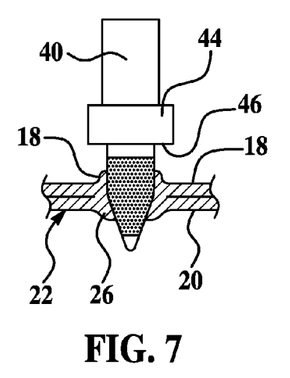
Figure 8:
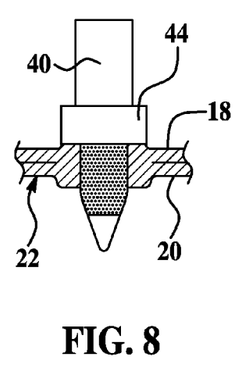
Figure 9:
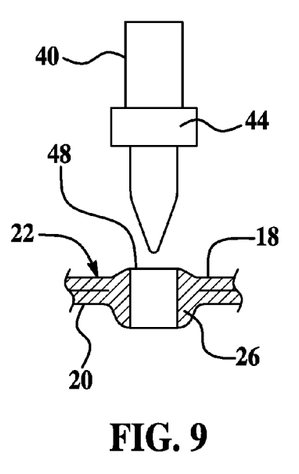

Friction from contact of rotated bit 40 and the overlapping material generates heat, which causes the overlapping material to soften and displace. As pressure of bit 40 on the surface the overlapping portion is maintained, bit 40 begins to index down into the softened wall material of the overlapping portion. As shown in FIGS. 5 and 6, penetration of the overlapping material occurs when material underneath the bit becomes softened throughout the thickness thereof incident to the bit. Penetration of bit 40 through the overlapping portion is shown in FIGS. 6-8 wherein penetration of bit 40 through the overlapping portion creates an aperture 28 in the overlapping portion. Also shown in FIGS. 4-8, friction heat generated in bit 40 is shown by the shaded portions of FIGS. 4-9.

In accordance with an exemplary embodiment, the mounting head protruding from the formed boss includes a contoured surface configured to contact a corresponding surface of a gas sensor when the gas sensor is secured to thereto. In accordance with an exemplary embodiment, the contoured surface is intended to substantially mate with a corresponding surface of the gas sensor in order to prevent gas leaking from an interface between the gas sensor and the boss. In accordance with an exemplary embodiment and in order to form the contoured surface, bit 40 further comprises a collar 44 adjacent to tip 42. In an exemplary embodiment surface 46 of collar 44 has a geometry which presses against the softened outer surface of the formed boss to form a contoured surface 48 on a portion of a mounting head 30 of a mounting boss.

In an exemplary embodiment, the geometry of surface 46 of collar 44 substantially conforms to the geometry of contoured surface 48 and the corresponding surface of the gas sensor to be secured thereto. For example, if the corresponding surface of the gas sensor is flat, the contoured surface is flat. If the corresponding surface of the gas sensor is beveled, the contoured surface is beveled in an opposite and complimentary manner. In an alternative exemplary embodiment, a gasket may be utilized when the gas sensor is secured to mounting boss to ensure that an appropriate seal exits between the gas sensor and the boss to ensure proper operation of the gas sensor with the exhaust system.

In an exemplary embodiment, when forming the boss, the shape of bit 40 may have a generally widening diameter from tip to shaft and a sufficient diameter to form the desired busing size. A pointed tip is used to allow for softening to begin, with high pressure, at a localized point. Heat and friction generated from the point propagate out to surrounding material to cause the required phase change. When the bit is indexed down consistently at a substantially maintained pressure, softening of adjacent material will allow for smooth indexing and penetration of the component material. In an exemplary embodiment, a lobed, conical bit is used to accomplish smooth indexing of the bit into the overlapping portion to form the mounting boss. For example, reference is made to U.S. Pat. No. 4,454,741 issued to Hoogenboom, the contents of which are incorporated herein by reference thereto. In accordance with the teachings of U.S. Pat. No. 4,454,741, the contour of the rotated bit cross-section may be determined by the following formula:

$$R(\phi) = Ro - \frac{1}{2}e + $$
$$\frac{1}{2}e\cos\left\{\arccos\left(\delta\sin^2 n\phi + \frac{|\cos n\phi|}{\cos n\phi}\sqrt{\delta^2\sin^4 n\phi - \delta^2\sin^2 n\phi + \cos^2 n\phi}\right) + a\right\}$$

in which the condition is valid for the solutions of $R(\phi)$:

$$(\sin n\phi) - $$
$$\sin n\left\{\arccos\left(\delta\sin^2 n\phi + \frac{|\cos n\phi|}{\cos n\phi}\sqrt{\delta^2\sin^4 n\phi - \delta^2\sin^2 n\phi + \cos^2 n\phi}\right)\right\} \geq 0$$

and in which R=Radius vector from the drill center, Ro=radius vector in a starting point of the contour in one of the apexes of the polygon, $\phi$=the angle between R and Ro, e=Rmax−Rmin, $\delta$ is the modulation factor and $\alpha$ is the non-symmetry factor. The preference for this contouring lies in the fact that a continuous contour is obtained which is based on a complex harmonic curve, which provides a uniform load distribution along the part operating within the hole wall of the target material.

Additionally, a cutting fluid may be used to facilitate smooth penetration by the bit into the overlapping portion, wherein the cutting fluid acts to prevent the adhesion of molten or softened shell material to the bit while promoting even formation of upset material. In an exemplary embodiment, a minimum amount of cutting fluid is used since use of excess fluid may result in the conductance of heat away from the target material, which deters softening of the shell material and results in substandard boss.

Figure 10:
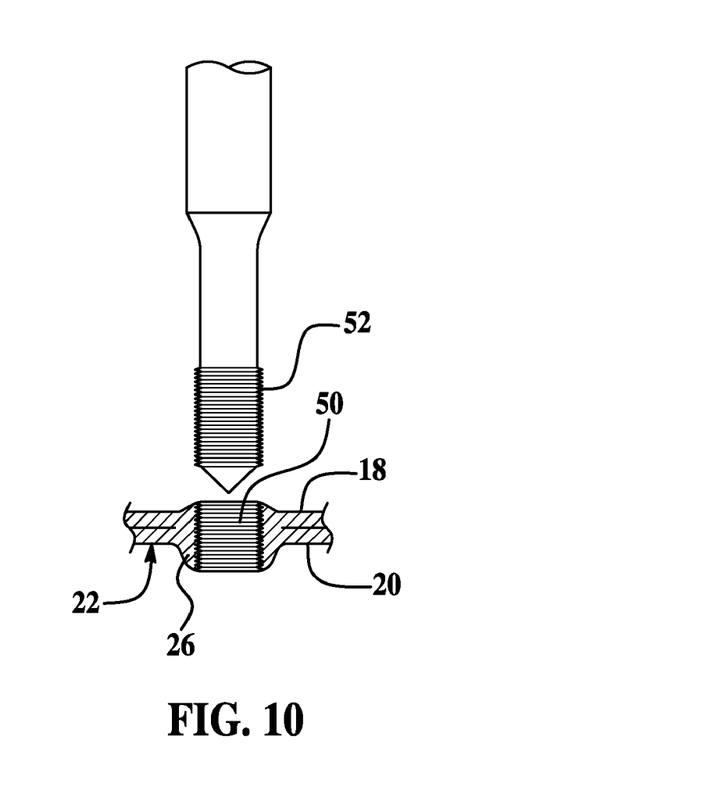

Referring now to FIG. 10 and in an exemplary embodiment, after bit 40 has penetrated the overlapping portion, forming the aperture and the mounting head, a threaded portion 50 is formed about an inner surface of the aperture to enable a threaded oxygen or gas sensor to be readily secured thereto. The threading of the aperture may be threaded by methods known in the art including but not limited to the use of a tapped bit 52 to cold work the threads.

Figure 11:
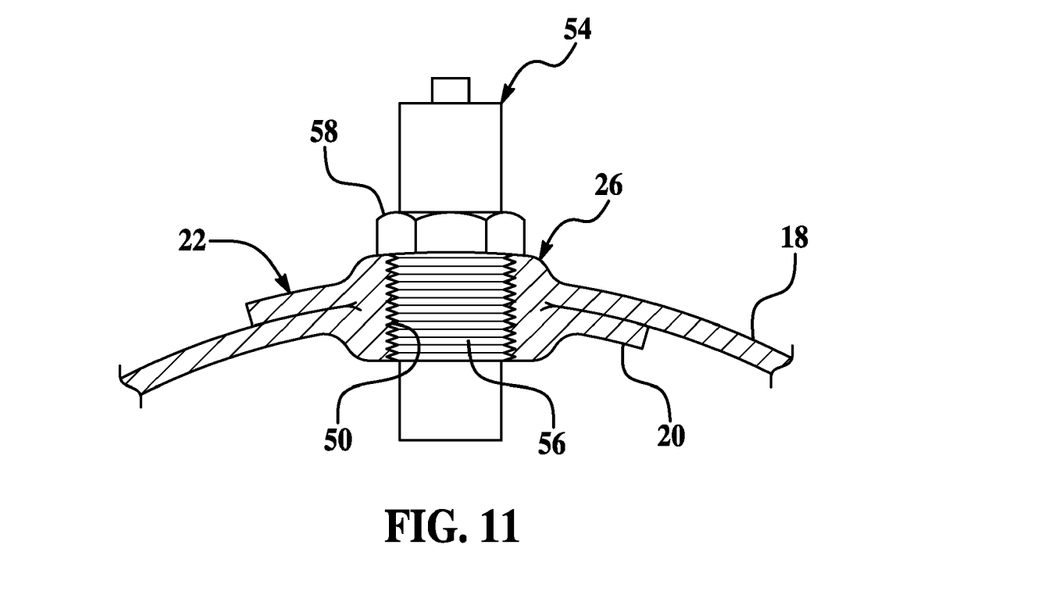
FIG. 11 is a cross-sectional view of the overlapping portion with a gas sensor mounted therein.

Referring now to FIG. 11, a gas sensor 54 is shown mounted to the boss formed in the overlapping portion. As illustrated, gas sensor 54 is configured to have a plurality of threads 56 configured to engage threaded portion 50 wherein a nut portion 58 is configured to sealingly mate with contoured portion 48. In addition, a sensing element of the gas sensor is disposed within the cavity formed by the outer shell.

In accordance with an exemplary embodiment, boss 26 is formed in overlapping portion 22 to provide a more robust securement connection between the gas sensor and the shell housing the sensor is coupled to. In accordance with an exemplary embodiment, the overlapping portion, which is defined by extended overlapping end portions of the outer shell provides a thicker area to form the boss therein. For example, the overlapping portion provides at least twice as much thickness than a non-overlapping portion of the shell.

In an exemplary embodiment, the overlapping portion includes a first end portion and a second end portion of the shell portion. In an exemplary embodiment, the first end portion is secured to the second end portion via any suitable attachment process. For example, the first end portion is secured to the second end portion by any suitable securement method including welding processes (e.g., a mash seam weld process; TIG, MIG or Laser welding processes). In another exemplary embodiment, a fixture is used to secure the end portions together to form the overlapping portion. Additionally, a fixture can also be used to locate the mounting boss in the overlapping portion.

In accordance with an exemplary embodiment, the mounting boss is formed in the overlapped portion by deforming a portion of the overlapped portion, wherein an aperture, a mounting head, and a threaded portion are formed therein.

The overlapping or overlapped portion of the shell includes an aperture through which the gas sensor protrudes into an interior area of the shell thereby being exposed to the exhaust gases passing therethrough. The overlapped portion enables the gas sensor to be threadably coupled to the shell with greater torque strength so that the gas sensor does not loosen or exhaust gases leak through the joint during vehicle operation. In an exemplary embodiment, a forming process is used to form a mounting boss at the overlapping portion. For example, a flow drilling and taping process is used to form the mounting boss, wherein portions of the shell walls are deformed when forming the mounting boss.

In an alternative exemplary embodiment, a weld portion is applied to the area of the overlapping portion where the gas sensor mounting boss is to be formed to provide a more rigid engagement between the shell walls at the overlapped portion. In another exemplary embodiment, the mounting boss and/or the weld portion are configured to provide a contoured surface to better match a corresponding surface of the gas sensor for preventing exhaust gases leaking through the joint. The exemplary embodiments disclosed herein are intended to be applied to any exhaust pipe or shell materials used in vehicle exhaust systems. For example, in an exemplary embodiment, an exhaust shell is a stainless steel shell having a wall thickness of 1.2 millimeters. Of course, wall thicknesses greater or less than the aforementioned values are contemplated in accordance with exemplary embodiments of the present invention.

Figure 12:
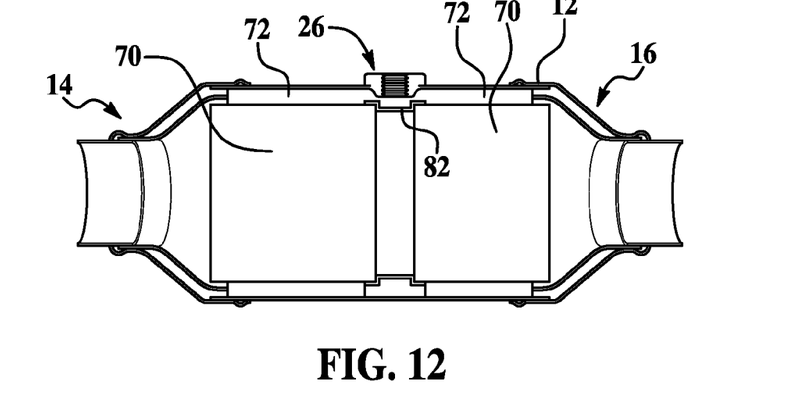
FIGS. 12-14 are cross-sectional views of catalytic converters constructed in accordance with exemplary embodiments of the present invention.
Figure 13:
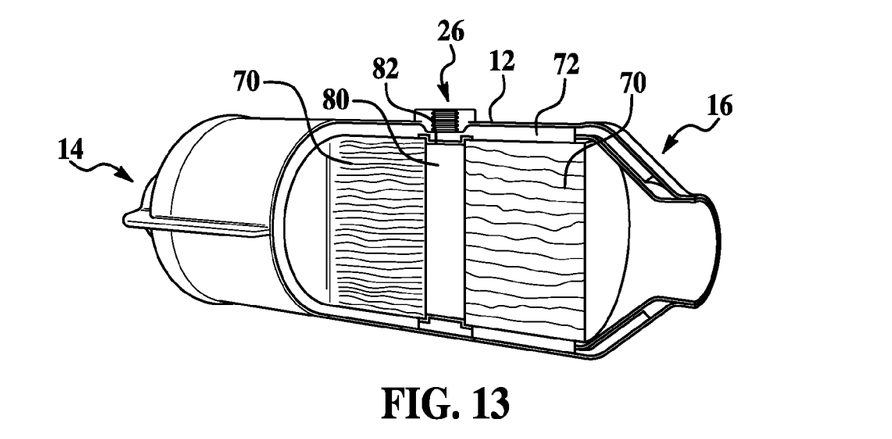
Figure 14:
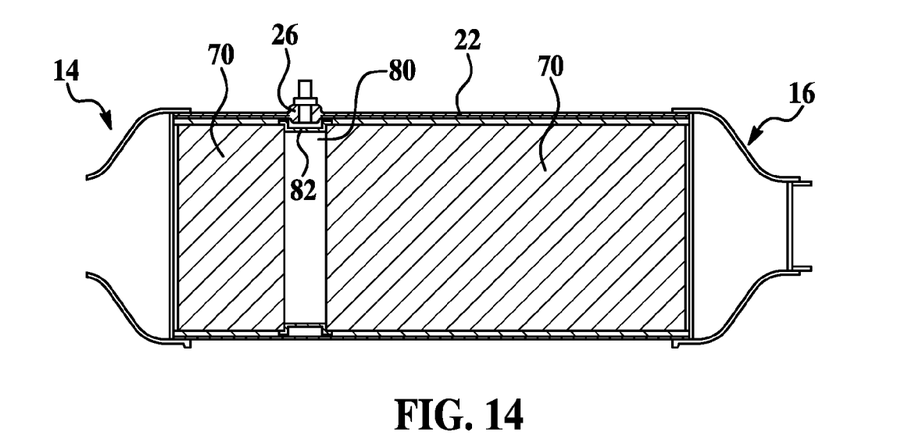

Referring now to FIGS. 12-14, a catalytic converter housing with a gas sensor mounting boss in accordance with an exemplary embodiment of the present invention is illustrated. In this embodiment, the gas treatment device is illustrated with a substrate, support, monolith, or brick (70), which includes a catalyst material coated thereon. A mounting device such as a mat support material (72) comprising an intumescent material, non-intumescent material, or a combination of both, is disposed about the substrate forming a mat support material/substrate subassembly, prior to being inserted into the housing.

One non-limiting method for inserting the mat support material/substrate subassembly into the housing comprises using a stuffing cone and stuffing cone apparatus. An example of one such apparatus and process is described in U.S. Pat. No. 6,532,659, the contents of which are incorporated herein by reference thereto. In this method, the outlet of the stuffing cone, which is disposed adjacent to the inlet of the housing, has an inner diameter less than the inner diameter of the housing. As the mat support material/substrate subassembly moves through the stuffing cone toward the housing, the stuffing cone compresses the mat support material about the substrate so that the subassembly can be disposed into the housing. More particularly, as the mat support material/substrate subassembly slides against the inwardly tapered interior of the stuffing cone, the mat support material compresses about the substrate until the mat support material substrate subassembly has an outer diameter less than the housing outer diameter. At this point, the mat support material/substrate subassembly is pushed into the housing.

Generally, the stuffing cone's diameter is less than the diameter of the smallest housing to be stuffed using that particular stuffing cone to ensure the subassembly is sufficiently compressed to be inserted into the housing.

In one non-limiting embodiment, the stuffing cone apparatus comprises a funnel, a pusher detail and a retainer detail. The funnel comprises a conduit with an interior tapered inwardly from a first end toward an opposing second end. The first end comprises a diameter large enough to accept a mat support material/substrate subassembly. The opposing second end comprises a diameter that is less than or equal to the internal diameter of the main body of a housing, which is used to house the mat support material/substrate subassembly after placement therein by the stuffing cone apparatus. Optionally, the second end can comprise a portion having a substantially consistent diameter (e.g., a cylindrical portion, or the like).

Additionally, the funnel preferably comprises a locating cavity disposed towards the second end of the funnel for the placement of the housing.

The funnel can possess a cross-sectional geometry such as rounded (e.g., round, oval, elliptical, irregular, and the like), polygonal (e.g., triangular, square, trapezoidal, pentagonal, hexagonal, heptagonal, octagonal, and the like, as well as combinations comprising at least one of the foregoing polygonal shapes), and the like, as well as combinations comprising at least one of the foregoing geometries. With respect to the overall shape, it can be a hollow, elongated geometry capable of receiving the subassembly, compressing the mat support about the substrate as the subassembly moves through the stuffing cone, and introducing the compressed subassembly to the housing. Some possible overall geometries include cylindrical, tubular, conical, and the like, with a truncated conical shape, or a combination of conical and cylindrical shapes preferred.

Disposed at the first end of the stuffing cone is a pusher detail comprising an arm, a disc, and an optional contact detail. The pusher detail is designed to slideably engage the first surface of the mat support material/substrate subassembly, and force it through the stuffer funnel into the housing. Consequently, the pusher detail preferably has a main face with a geometry compatible with the area of the mat support material/substrate subassembly with which it will make contact. For example, the mat support material/substrate subassembly first surface can be flat, and the pusher detail can have a disc with a flat main face.

In order to compensate for mat support material/substrate subassembly first surface irregularities, a contact detail may be disposed on the main face. The contact detail can comprise a compliant material, such as an elastomer (e.g., rubber, or the like), that is capable of conforming to the substrate surface upon main face engagement.

Disposed perpendicular to a surface opposite the main surface is an arm or rod that connects to the disc to form a "T", plunger, piston, or the like. The pusher detail is preferably designed to exert substantially uniform pressure across the mat support material/substrate subassembly first surface.

Disposed at an opposite end of the stuffing cone apparatus, i.e., at the end of lesser diameter, is a retainer detail, e.g., the retainer detail can optionally be a mirror of the pusher detail, disposed on an opposite side of the mat support material/substrate subassembly. Consequently, the retainer detail comprises disc disposed on the end of an arm to form a "T", plunger, piston, or the like. As with the pusher detail, the retainer detail can comprise various sizes and geometries as described above. The retainer detail provides structural integrity to the mat support material/substrate subassembly as it is forced through the stuffing cone into the housing. Consequently, the retainer detail's size and geometer are preferably based upon the structural integrity and geometry of the second surface of the mat support material/substrate subassembly that engages the retainer detail. As with the pusher detail, the retainer detail can employ a compliant material on the surface that engages the mat support material/substrate subassembly.

This stuffing cone apparatus can be employed with numerous types and designs of substrates, mat support materials, and housings. For example, the substrate can comprise any material designed for use in a spark ignition or diesel engine environment, and which has the following characteristics: (1) capable of operating at temperatures up to, and exceeding, about 1,000 .degree. C. (depending upon the location of the treatment device; e.g., under-floor, close coupled, in the manifold, and the like); (2) capable of withstanding exposure to hydrocarbons, nitrogen oxides, carbon monoxide, carbon dioxide, sulfur, particulates, and/or sulfur oxides; and, if desired, (3) having sufficient surface area and structural integrity to support the desired catalyst. Some possible materials include cordierite, silicon carbide, metal, metal oxides (e.g., alumina, and the like), glasses, and the like, and combinations comprising at least one of the foregoing materials. Some ceramic materials include "HONEY CERAM", commercially available from NGK-Locke, Inc, Southfield, Mich., and "CELCOR", commercially available from Corning, Inc., Corning, N.Y. These materials can be in the form of foils, porous structures (e.g., porous glasses, sponges), monoliths (e.g., a honeycomb structure, and the like), and the like, as well as combinations comprising at least one of the foregoing forms.

Disposed on and/or throughout the substrate is optionally a catalyst capable of reducing the concentration of at least one component in the gas. The catalyst may comprise one or more catalyst materials that are wash coated, imbibed, impregnated, physisorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, nickel, copper, and the like, as well as oxides, alloys, and combinations comprising at least one of the foregoing catalyst materials, and other catalysts.

Disposed around the substrate is the mat support material that can comprise an intumescent material (e.g., comprising a vermiculite component), a nonintumescent material, or combinations thereof. The intumescent material, for example, is one which comprises ceramic materials, and other materials such as organic binders and the like, or combinations comprising at least one of the foregoing materials. The vermiculite component is a component that expands with heating to maintain firm uniform compression, or non-uniform compression, if desired. The non-intumescent material, for example, is one that does not contain vermiculite. Non-intumescent materials include materials such as 900HT, 1100HT, and those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials include materials, sold under the trademark "INTERAM" by the "3M" Company, Minneapolis, Minn., such as Interam 100, as well as those intumescents which are also sold under the aforementioned "FIBERFRAX" trademark by the Unifrax Co., Niagara Falls, N.Y., as well as combinations comprising at least one of the foregoing materials, and others.

Additionally, the housing can be any material and design appropriate for use with the particular substrate geometry, size, and material. The housing is preferably designed to receive the mat support material/substrate subassembly and withstand the particular operating condition (e.g., close coupled, under floor, and the like). Due to the flexibility and structural integrity provided by the dual details (pusher and retainer), non-symmetrical, complex, cross-sectional geometries may be employed. Additionally, several substrates can be employed. For example, several substrates can replace a single substrate, thereby enabling the use of different substrate and/or catalyst material in different areas of the housing.

Figure 15:
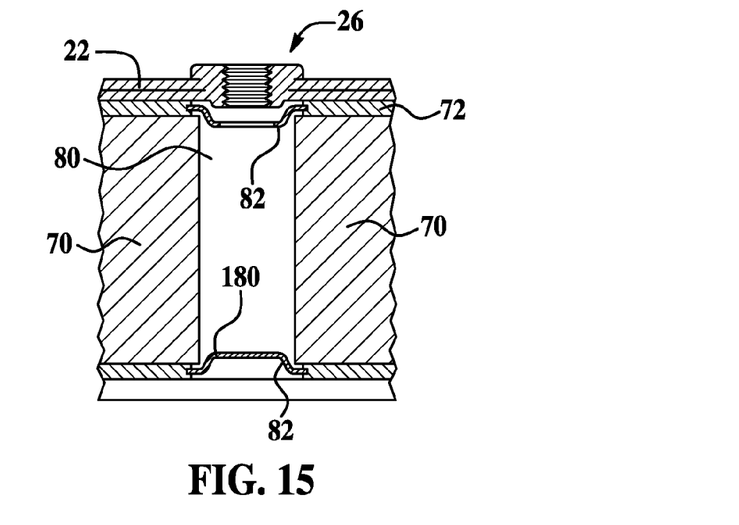
FIG. 15 is a cross sectional view of an alternative exemplary embodiment.
Figure 16:
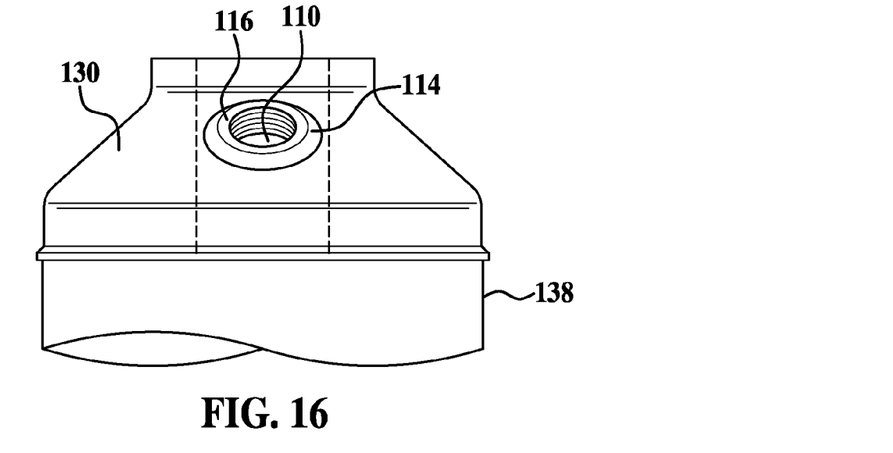
FIG. 16 illustrates a side view of an endcone exhaust component in accordance with an exemplary embodiment of the present invention.
Figure 17:
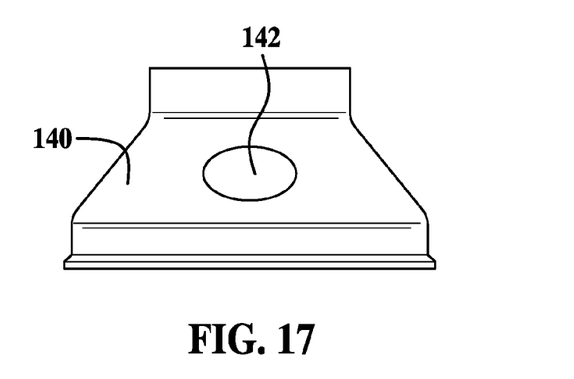
FIG. 17 is a side view of the inner shell component for use with the endcone illustrated in FIG. 16.

In an alternative exemplary embodiment and referring now to FIG. 15 a spacer ring 80 is disposed between the catalyst bricks to provide a cavity 82 between the bricks wherein the cavity and/or ring is orientated to provide for the flow drilling process of exemplary embodiments to occur in the overlapping portion of the housing. In this embodiment, the spacer ring is inserted first and the inlet and outlet catalyst bricks are inserted from either side and the overlapping portion is form drilled in accordance with exemplary embodiments of the present invention. In addition and in yet another alternative, insulation is disposed between the spacer ring and the outer shell in the ring area to protect surrounding components and the sensor. Other contemplated alternatives include an insulated spacer ring or a dual layered insulated spacer ring.

Referring now to FIGS. 16-20 other exemplary embodiments are illustrated. Here the gas sensor bushing is integrally formed in an endcone of an exhaust treatment device. In one exemplary embodiment, the busing is formed in an overlapping portion of the endcone illustrated by the dashed lines in FIG. 16 similar to the embodiments illustrated in FIGS. 1-3. In other words, at least one wall portion of the endcone has an overlapping portion to provide a thickened area for the flow-drilling process. In another exemplary embodiment, a pair of tab portions provide the overlapping portion (e.g., similar to at least FIG. 3).

In another exemplary embodiment, the busing is formed in double walled portion of the endcone wherein the inner and outer wall portions are either spaced away from each other prior to the forming of the bushing or alternatively they are adjacent to each other prior to the forming of the bushing. In any of the aforementioned embodiments a sufficient amount of material is available for being displaced by the flowdrilling process to form the bushing therein.

Exemplary embodiments of the present invention relate to an exhaust system component comprising a sensor (e.g., oxygen or otherwise) integrally mounted in the housing of the exhaust system component, wherein the sensor is disposed in the exhaust stream of the exhaust system component. In one exemplary embodiment, an oxygen sensor is mounted to the exhaust system component with integral high seal bushings preferably having flat head mounts. The sensor can be any conventional sensor such as those conventionally employed in automotive exhaust systems. In order to provide an adequate seal the sensor should have a mounting surface for connecting the sensor to the exhaust system.

Figure 18:
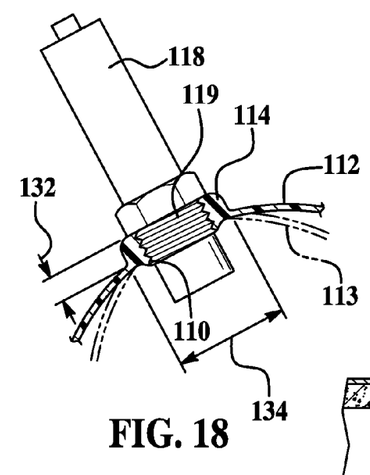
FIG. 18 is a cross-sectional view of the bushing formed in the material of an endcone exhaust component in accordance with one exemplary embodiment.
Figure 19:
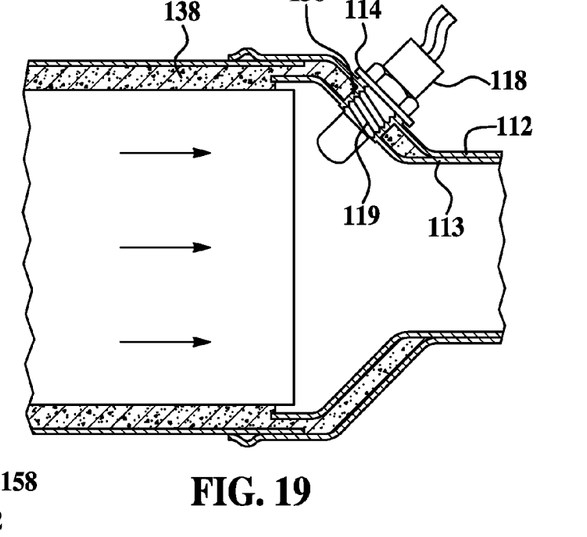
FIG. 19 is a partial cross-sectional view of an endcone of an exhaust treatment device having a bushing formed from the material of a double walled endcone.

In accordance with an exemplary embodiment the rotated bit is indexed through the endcone such that substantially complete penetration of the component (e.g., outer wall and inner wall material or overlapping portions is affected). As shown in FIG. 19, a double wall arrangement is provided and the rotated bit will be indexed down and proceed to penetrate an outer wall 112 and an inner wall 113 of the end cone. Preferably, as depicted in FIGS. 18 and 19, the extruded skirt material formed when penetrating the outer wall 112 merges with the upset material formed when penetrating the inner wall 113, so as to result in a continuous connection between the two walls that can be tapped to accept a threaded connector 119 of an oxygen sensor 118.

In accordance with an exemplary embodiment the rotated bit of the drilling device comprises a collar 124 adjacent to a tip 122 disposed coaxially with a shaft 126 of the bit. In accordance with an exemplary embodiment a flatting surface 128 of the collar preferably has a geometry which, when pressed against the softened component outer wall material displaced by the tip, forms the desired ring of upset material 114 with the desired substantially flat mounting surface 116. Preferably, surface 128 is substantially flat such that, when collar 124 contacts the softened component material 112, the upper surface of that material is substantially flattened, forming ring of upset material 114. This creates a substantially flat and even mounting surface 116, as is typically required by oxygen sensors to obtain a good seal.

It should be noted that, while it is preferred to use a flat mount on a curved surface, its use is not absolutely necessary to properly mount an oxygen sensor. Alternately, or in conjunction with a substantially flat mount, a gasket may be used to create a sealable mounting surface for embodiments using a rotated bit lacking a collar with a flatting surface. In one embodiment, the gasket should be made of a material capable of maintaining structural integrity under the oxygen sensor operating conditions and sufficiently elastic to create a seal between slightly uneven upset material and the oxygen sensor to be installed. Such materials should also be sufficiently temperature resistant to typical exhaust system operating temperatures.

In forming the bushing, the shape of the rotated bit is generally unimportant, except that it should have a generally widening diameter from tip to shaft and a sufficient diameter to form the desired busing size. A pointed tip is preferred to a blunt tip since pointed tips allow for softening to begin, with high pressure, at a localized point. Heat and friction generated from the point propagate out to surrounding material to cause the required phase change. Where the bit is indexed down consistently at a substantially maintained pressure, softening of adjacent material will allow for smooth indexing and penetration of the component material. Though a number of bit designs are conceivable, the best design to accomplish such smooth indexing is a lobed, conical bit.

Figure 20:
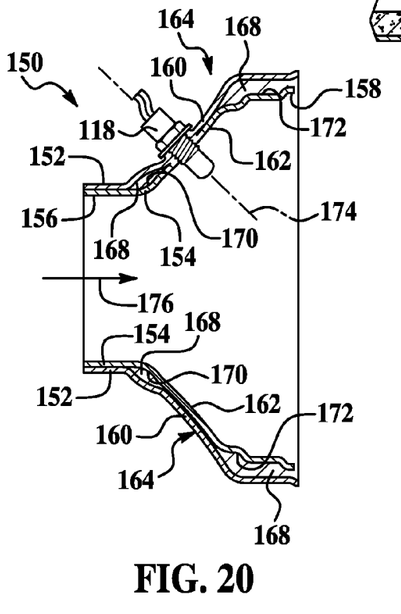
FIG. 20 is a cross-sectional view of an endcone exhaust component in accordance with an alternative exemplary embodiment of the present invention.

Referring now to FIG. 20 another alternative exemplary embodiment of the present invention is illustrated. Here a double walled endcone 150 is illustrated with an outer wall 152 and inner wall 154. The double walled endcone provides an inlet opening 156 and an outlet opening 158 or alternatively and depending on the location of the endcone, opening 158 is the inlet opening and opening 156 is the outlet opening. Here each wall portion inner and outer are configured to provide a substantially flat area 160 and 162 to provide a flat area 164 having a substantially greater thickness than just a single walled portion of the end cone (e.g., thickness of wall portion 152 plus the thickness of wall portion 154) thus providing an adequate amount of material to provide a sensor mounting boss therein using for example a flowdrilling technique or alternatively a welding process is preformed in the thickened flat area. In this embodiment, an insulating mat material 168 is only located in spaced apart regions 170, 172 of the inner and outer wall members as the inner wall member and the outer wall member are sealed to each other proximate to the bushing. In this embodiment, the sensor bushing is formed in the flat area and the sensor is located at an angle offset from a flow path of a fluid through the endcone. One non-limiting position of the sensor and its bushing is illustrated by line 174 while the flow path is illustrated by line 176. This angular orientation of the sensor allows the exhaust treatment device to have a lower profile thus making it easier to install the same underneath a vehicle.

Another non-limiting exemplary embodiment of the present invention is set forth in the example described below:

EXAMPLE

A rotated bit was utilized to form an integral bushing on a North American trapezoid catalytic converter endcone assembly 130 (shown in FIG. 16), which is illustrated as connected to the catalytic converter 138. The North American trapezoid endcone assembly 130, which consists of an outer surface material, an inner cone 140, and a mat material 138 therebetween (See FIG. 19), was fabricated with a precut, 25 mm hole 142 located in the inner end cone 140 and through the mat material 138. The path of the rotated bit being cleared below, bushing formation was performed in the top side of the end cone 130 on the surface of the outer cone.

Design work took into consideration the angle that the oxygen sensor would be mounted, minimizing the radial distance the sensor would protrude, and reviewing the position of the sensor's louvered plenum with relationship to the catalyst. As shown in FIG. 18, it was determined that, on the surface of the North American trapezoid, the bushing 110 would have an upset surface having a height 132 of approximately 6.4 mm and a diameter 134 of approximately 30 mm.

The rotated bit process was evaluated on typical Tool Room End Mill Machines. The endcones were set up to locate a flat surface perpendicular to the axis of movement of the head. The rotated bit which operated at 2500 revolutions per minute (RPM), had a shaft diameter of 17.3 mm. The bit was manually lowered until the tip met the surface of the endcone with a force which was held constant while the material reached a molten state. Approximately when the material and the bit tip was viewed to be red hot, the constant force of the bit caused penetration of the material. The ram was indexed down quickly and consistently until both the outer wall and the inner wall were penetrated and the bit collar bottomed on the surface of the endcone and finished flattening the upset material. To prevent molten material from adhering to the surface of the bit, cutting fluid was used on the rotated bit.

Upon removal of the rotated bit and cooling of the target material, threads were formed on the inner surface of the bushing, which extended from the outer wall to the inner wall, by using a Flow Tap of size M18.5-1.5 thread, operated at 300 RPM. The ram was lowered again until the rotating Flow Tap engaged the bushing and continued until the bushing was completely threaded.

The application of the rotated bit and tapping was completed on the North American end cone assembly 130 (see FIGS. 16-17) after assembling the end cone. In order to reduce the amount of material which would be displaced in the process of forming the bushing and to reduce the size of the inner skirt, a hole can be made through part or all of the way through the cone. For example, a hole 142 was precut in the inner end cone 140 and the mat material prior to assembly. The holes were made 30 mm in diameter; large enough to prevent potential interference with the rotated bit process. The end cones and mat material were assembled and located beneath the rotated bit at a predetermined angle that would result in the surface being perpendicular to the bit.

Each bushing showed good durability and zero leaking subsequent to oxygen sensor installation. It was further shown that threading subsequent to bushing formation produced acceptable results. Results indicated better bushing quality for a metal substrate at 0.072 inches thick, and acceptable quality on a thinner, 0.057 inch thick, trapezoid end cone. Specifically, the thicker material provided more upset material for formation of a better sealing surface. As such, results seem to indicate a preferred thickness of above about 0.05 inches for a 17.3 mm rotated bit operating on 409 Stainless Steel at 2,500 RPM.

Previously, oxygen sensors required substantially flat exhaust system component surfaces for mounting because bushings could not be formed on rounded components such that a complete seal could be obtained around the circumference of the oxygen sensor mount. Since the present system can incorporate a flat sealing surface, the oxygen sensors can be mounted where the need is greatest and not only where a flat surface is provided. As such, oxygen sensors can be mounted in curved areas of the catalytic converter, in converter end plates, or even in curves of exhaust piping as well as other locations.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application

What is claimed is:

1. An outer housing for an exhaust system, the outer housing comprising:
    an elongated housing portion defining an inlet opening and an outlet opening, the elongated housing portion comprising a single shell wall having a thickened area defined by overlapping first and second portions of the said shell wall, the thickened area being defined in a discrete location about the circumference of the shell wall;
    a sensor mounting boss formed in the overlapping portion, the sensor mounting boss being defined with only displaced portions of the overlapping portion; and
    a plurality of threads defined in the sensor mounting boss.

2. The outer housing as in claim 1, wherein the thickened area is defined by overlapping first and second end portions of the said shell wall.

3. The outer housing as in claim 2, wherein a thickness of the thickened area is substantially equal to twice a thickness of a non-overlapping portion of the shell wall.

4. The outer housing as in claim 3, wherein the outer housing is an endcone of an exhaust treatment device.

5. The outer housing as in claim 3, wherein the first end portion is secured to the second end portion by a mash seam welding process.

6. The outer housing as in claim 1, wherein a thickness of the thickened area is substantially equal to twice a thickness of a non-overlapping portion of the shell wall.

7. The outer housing as in claim 1, wherein the elongated housing portion is formed from a stainless steel material and the elongated housing portion is a substantially tubular shaped shell.

8. The outer housing as in claim 1, wherein the overlapping first and second end portions of the said shell wall traverse an entire length of the elongated housing portion.

9. The outer housing as in claim 1, wherein a width of the overlapping first and second end portions of the said shell wall is greater than one inch and less than three inches.

10. The outer housing as in claim 1, wherein the sensor mounting boss is formed by a flowdrilling process.

11. The outer housing as in claim 1, wherein the first end portion and the second end portion each have a tab portion to define the thickened portion.

12. The outer housing as in claim 1, wherein the housing is stuffed with a pair of exhaust treatment bricks being spaced apart from each other to provide an unoccupied area within the housing and the sensor mounting boss is positioned to align with the unoccupied area.

13. The outer housing as in claim 12, wherein a ring is positioned between the pair of exhaust treatment bricks to provide the unoccupied area.

14. The outer housing as in claim 1, wherein the outer housing is a portion of a catalytic converter.

15. A method of forming a mounting boss for a gas sensor in an outer housing of an exhaust gas component, the method comprising:
- overlapping a first portion of a single shell wall of the exhaust gas component with a second portion of the said single shell wall of the exhaust gas component;
- securing the first portion of the single shell wall to the second portion thereof to define an overlapping portion having a thickened area defined in a discrete location about the circumference of the single shell wall;
- forming a mounting boss in the overlapping portion with flowdrilling process, the mounting boss being formed from displaced material of the overlapping portion.

16. The method as in claim 15, wherein a thickness of the overlapping portion is substantially equal to twice a thickness of a non-overlapping portion of the shell wall of the exhaust gas component.

17. The method as in claim 15, wherein the housing is stuffed with a pair of exhaust treatment bricks being spaced apart from each other to provide an unoccupied area within the housing and the sensor mounting boss is positioned to align with the unoccupied area and a ring is used to provide the unoccupied area.

18. An endcone of an exhaust treatment device, the endcone comprising:
- an outer wall portion and an inner wall portion;
- a sensor mounting boss formed in the outer wall portion and the inner wall portion, the sensor mounting boss being defined with only displaced portions of the outer wall portion and the inner wall portion; and
- a plurality of threads defined in the sensor mounting boss.

19. The endcone as in claim 18, wherein the sensor mounting boss is formed in substantially flat portions of the inner wall portion and the outer wall portion.

20. The endcone as in claim 19, wherein the substantially flat portions of the inner wall portion and the outer wall are in contact with each other and the endcone further comprises cavities defined by spaced apart portions of the inner wall and the outer wall and an insulating material is disposed therein.

21. The outer housing as in claim 19, wherein the sensor mounting boss is formed by a flowdrilling process.

22. The method as in claim 15, further comprising the step of forming a plurality of threads in the sensor mounting boss.

* * * * *